United States Patent
Altermatt Couratier et al.

(10) Patent No.: US 11,164,483 B2
(45) Date of Patent: Nov. 2, 2021

(54) MEDICAL SIMULATOR FOR THE SIMULATION OF PUNCTURE OPERATIONS

(71) Applicant: PONTIFICIA UNIVERSIDAD CATÓLICA DE CHILE, Santiago (CL)

(72) Inventors: Fernando Altermatt Couratier, Santiago (CL); Constanza Miranda Mendoza, Santiago (CL); Benjamín Garnham Leniz, Santiago (CL); Jorge Sanz Guerrero, Santiago (CL)

(73) Assignee: Pontificia Universidad Católica de Chile, Santiago (CL)

( * ) Notice: Subject to any disclaimer, the term of this patent is extended or adjusted under 35 U.S.C. 154(b) by 525 days.

(21) Appl. No.: 16/066,892

(22) PCT Filed: Dec. 28, 2015

(86) PCT No.: PCT/CL2015/000070
§ 371 (c)(1),
(2) Date: Jun. 28, 2018

(87) PCT Pub. No.: WO2017/113022
PCT Pub. Date: Jul. 6, 2017

(65) Prior Publication Data
US 2019/0027066 A1    Jan. 24, 2019

(51) Int. Cl.
*G09B 23/34* (2006.01)
*G09B 23/30* (2006.01)
*G09B 23/28* (2006.01)

(52) U.S. Cl.
CPC .......... *G09B 23/34* (2013.01); *G09B 23/285* (2013.01); *G09B 23/30* (2013.01); *G09B 23/303* (2013.01)

(58) Field of Classification Search
CPC ...... G09B 23/285; G09B 23/30; G09B 23/34; G09B 23/303; G09B 9/00
See application file for complete search history.

(56) References Cited

U.S. PATENT DOCUMENTS 6,773,263 B2    8/2004    Nicholls et al.
8,784,111 B2    7/2014    Feygin et al.
(Continued)

FOREIGN PATENT DOCUMENTS

| GB | 251637 | 7/1927 |
| KR | 1407077 | 6/2014 |
| KR | 1471595 | 12/2014 |

*Primary Examiner* — Jerry-Daryl Fletcher
(74) *Attorney, Agent, or Firm* — Adams and Reese LLP; Raymond R. Ferrera

(57) ABSTRACT

A medical simulator of procedures associated with punctures, for simulation and practical training in puncture interventions, the medical simulator comprising a phantom, an intervention device and a processing system in data communication with the phantom and the intervention device, wherein the phantom comprises at least one target structure arranged for the training of the intervention and means for detecting the intervention device, said detection means being in communication of data with the processing system. The intervention device comprises a real puncture instrument that includes sensing means and detection means in data communication with the processing system. The phantom comprises a structure with at least two components, a simulation assembly that simulates the behavior of tissues and anatomical structures, and a base structure that forms the phantom support, wherein the base structure comprises accommodation and fixation means to house and fix the simulation assembly. The simulation assembly comprises at least one detection means of the intervention device arranged on the target structure and at least one detection means of the intervention device arranged under the objec- (Continued)

tive structure, wherein the processing and visualization system collects, stores, processes and displays the data coming from the sensing means and means of detection of the medical simulator for the visualization of the information by the user through a graphic interface.

35 Claims, 4 Drawing Sheets

(56) References Cited

U.S. PATENT DOCUMENTS

| | | |
|---|---|---|
| 2002/0168618 A1* | 11/2002 | Anderson ............ G09B 23/285 434/262 |
| 2004/0009459 A1* | 1/2004 | Anderson ............... G06T 19/00 434/262 |
| 2005/0214726 A1 | 9/2005 | Feygin et al. |
| 2013/0078603 A1 | 3/2013 | Yang et al. |
| 2015/0104773 A1 | 4/2015 | Toly et al. |

* cited by examiner

MEDICAL SIMULATOR FOR THE SIMULATION OF PUNCTURE OPERATIONS

The present invention relates to a medical simulator for the simulation of medical interventions, mainly for the practice of peripheral venous punctures and central punctures, as well as for the placement of catheters and cannulation.

The medical simulator of the invention reduces the risk associated with training in living patients, using a phantom or body model that simulates the scenario of the procedure being trained and, at the same time, allows acquiring the knowledge and skills required in a controlled environment by the user. With this object, the present invention comprises an objective feedback simulator and a performance monitoring platform, allowing to providing feedback in an automated way regarding the performance of users, largely dispensing with the need to have an instructor under a 1 to 1 ratio with the trainee.

Among other qualities of the medical simulator of the present invention, the implementation of the same allows a single instructor to supervise a greater number of trainees, using the computational capabilities associated with the medical simulator and the simplicity of the training interface offered by the unit.

In this respect, the present invention comprises the use of a graphical visualization interface in user equipment, such as Smartphones, Tablets or other visualization equipment, either for the real-time visualization of the performance of a simulated procedure or for visualizing the historic performance of the users.

STATE OF THE ART

Currently, in medical education the use of simulation offers the possibility of practicing risky procedures outside the patients and multiple times before a student has to face the real situation where there is a risk. Additionally, for most of the procedures to simulate where what is sought is to practice a skill or technical procedure, phantoms are used. These consist of models of the human body, or parts of it, of materials that emulate a human body and that emulate the anatomical characteristics that allow them to perform the procedures that are intended to simulate. These phantoms must deliver an experience similar to what it is to perform the procedure on a real patient, focusing on the characteristics that produce complications and that make this procedure unique. Another way to simulate is through digital simulators that allow recreating the experiences that involve certain procedures, in order to focus on the preparations and steps involved in the activity, making a kind of interactive evaluation of the steps to follow.

A problem with this type of simulation, focused on the development of technical skills, is that while the used phantoms can be faithful representatives of the human anatomy and offer an excellent platform of practice, the simulator itself does not provide feedback to the student about how the procedure has been performed. On the other hand, the digital simulators have the serious problem that although they allow to evaluate how a procedure was prepared or the steps to follow to make a procedure, the performance of this is not realistic, does not involve the performance of the procedure itself and it is not teaching technique by itself; therefore, this type of simulation is more an interactive test of knowledge than a true way of applying knowledge to patients. These problems require that, for training with the use of phantoms, the presence of teachers trained in medicine and simulation are required to supervise and correct the students during training, so that learning with phantoms may be meaningful and does not generate vices that can be transferred to patients.

The patent document U.S. Pat. No. 8,784,111 discloses a system for the practice of vascular access techniques, where said system provides a real simulation of the puncture procedure in humans. Said system comprises the simulation of the resistive forces that a trainee would experience during a real procedure, using a data processing system and an interface device that together are called a haptic device. The haptic device has a plurality of sensors to measure the movement of the device, which measurements are transmitted to the information processing system that determines, based on said measurements, a series of signals that are translated by the haptic device as resistance factors to puncture or other common behaviors of the actual procedure. That is, the system provides a feedback mechanism through signals that, from the processing of said signals, allows to electronically simulating the different behaviors that could exist in a real procedure, simulating forces, movements or others in front of the manipulation of the interface device.

Considering the above, the solution of the patent document U.S. Pat. No. 8,784,111 comprises a complex and high cost system that uses electronic technology for the simulation of the procedure that is simulated, so that to make it close to the real procedure. In addition, for this purpose, U.S. Pat. No. 8,784,111 document uses instruments that recreate the real instruments, which moves the simulation away from the real procedure.

On the other hand, GB 251637 proposes a system and method for the practice of injection techniques, comprising a tool that is injected into an apparatus and, by means of detection means for injection parameter, measures the precision of the method. Said system has an assembly of warning means, such as lights, alarms or others, for the deployment of the performance of the procedure, where the apparatus comprises an anatomical model that represents the real interface of the intervention. In this respect, the anatomical model or injection apparatus comprises a video capture device for recording and detecting the procedure.

Considering the above, although the solution of GB 251637 document is simpler than that proposed in patent document U.S. Pat. No. 8,784,111, said solution comprises an assembly of electronic equipment that makes the system more expensive, but necessary for training according to said document, where also the proposed solution does not allow an accurate record of the simulated intervention.

Finally, document US 2013078603 proposes a model of an arm for the training of intravenous injections. Said arm model comprises a layer of skin that is removable mounted in the model, a liquid impeller that provides blood-imitating liquid at a flow rate similar to blood, so that many users can use the same model for training. However, US 2013078603 document proposes a solution that neither allow simultaneous training of different types of procedures nor offer the precision required for the effective training of specific puncture skills, comprising a real but simple implementation restricted to the practice of intravenous injections, without offering specific results in terms of feedback from the training performed.

In this context, although in the prior art there are both simple and complex solutions for the training of medical procedures such as punctures, it is necessary to have a simple training solution that allows to faithfully reproduce a real intervention scenario, avoiding the risks associated with said real intervention and allowing the user to acquire the knowledge and skills required within a controlled environment. At the same time, this solution is expected to reduce the costs associated with its implementation in the training of personnel, allowing the solution to be widely used at low cost.

Considering the above, the medical simulator of the present invention falls right in the space between virtual simulators without physical part and phantoms without feedback, allowing the student to perform the procedure in an intelligent phantom that analyzes the way in which the procedure was performed from the point of view of how said procedure was carried out in the phantom. To this effect, the medical simulator of the present invention collects the information coming from the training, being able to understand the way in which the procedure was performed, to detect errors, record the information, and compare it with previous attempts of execution. With all this, a device connected to the phantom (which can be a Smartphone, Tablet, computer or other device) receives the information in an application/program and is responsible for making the final processing of the information, in order to show it to the student together with detailed feedback on how to improve in the future and what are the mistakes made in each training.

DESCRIPTION OF THE INVENTION

The present invention comprises a medical simulator in procedures linked to the puncture, for the practical training of personnel or users in said procedures, recreating with precision the procedure to be trained and facilitating the feedback of the performance of the user under training.

The medical simulator is aimed at punctures performed with standard catheters, both in peripheral punctures and in central punctures, incorporating the procedure they involve before being performed and during its execution.

To such effect, the medical simulator has four main components:
  Phantom—this is an anatomical model of parts of the human body, for example, an arm, a leg, or portion of any of these, recreating the anatomical scenario of training;
  Intervention device—this comprises a needle or real puncture instrument with which the puncture is performed, integrating sensing and detection means for the characterization of the position and movement of the device;
  Processing and visualization system—this is responsible for integrating the signals coming from the intervention device and the phantom, processing the information and providing significant feedback for the evolution of training.

The four main components are described in more detail below.

Phantom

The medical simulator comprises a corporal or phantom model that simulates the procedure scenario, particularly the anatomy related to the area of intervention. The phantom is a training model arranged to recreate the simulated surface, where said phantom comprises means for detecting the user's interaction with the model, for example, the recreation of a section of a human arm comprising means to detect the presence and position of an instrument. That is, the phantom used corresponds to an anatomically correct model of some part of the body that is a usual recipient of peripheral venous punctures or other types of punctures, for example, the forearm or leg.

Considering the above, the phantom emulates, among other characteristics, the necessary resistance when making a puncture or cannulation, as well as containing within itself target structures in an arrangement that simulates the behavior of said structure within the human body, for example ducts to simulate the fluid carried by the veins inside the human body. In fact, according to an embodiment, the target structure simulates veins or arteries by means of ducts that contain liquid inside, emulating the blood of the human body. Additionally, said liquid can have pressure given either by a pump or by a container located in height with respect to the phantom, where said container is connected to the phantom and can be freely filled to simulate the behavior of the target structure more accurately.

In this context, the phantom of the medical simulator of the present invention comprises at least one target structure, which is the object of the intervention to be tried. For example, for the practice of interventions associated with vascular punctures, the target structure comprises elements of the circulatory system. In this regard, the target structure can comprise any anatomical structure subject to a medical intervention by puncture.

Considering the above, a preferred embodiment of the invention comprises that the phantom is formed by at least two components, where said components simulate the characteristics of the anatomical structure in the procedure being simulated. In this respect, the at least two components of the phantom correspond to an assembly or simulation kit and a base structure, which are described in more detail below.

Simulation Assembly

The assembly or simulation kit corresponds to the main structure of the phantom, being the functional component during the procedure to be simulated. Said simulation assembly is formed by a structure comprising at least two parts, a first part that simulates the behavior of the tissues and anatomical structures present in the surroundings of the target structure, mainly between the epidermis and said structure, and a second part which corresponds to the target structure itself, which is integrated or embedded in the first part of the simulation assembly.

The first part of the simulation assembly is characterized by reflecting the behavior of the tissues and anatomical structures against the action of an instrument or intervention tool, such as a needle, simulating the elasticity and resistance offered by tissues and anatomical structures to said devices in the reality. In this respect, the first part of the simulation assembly is manufactured in one or more materials that simulate the behavior of said tissues and anatomical structures.

In an embodiment of the invention, the first part of the simulation assembly comprises at least one means for detecting the intervention device, preferably at least two detection means, which allow detecting the position of the intervention device in the assembly of simulation during the training.

According to a preferred embodiment, the detection means correspond to a pair of electrodes integrated in the simulation assembly, particularly in different layers thereof, being connected to a data acquisition module of the medical simulator and being preferably one above the target structure and another one below the target structure. The electrodes consist of conductive material that can be punctured without being damaged, so that it can be used again.

In addition, since the characteristics of the simulation assembly allow simulating the behavior of the tissues and real anatomical structures in a puncture procedure, for different types of interventions to be simulated different simulation assemblies can be made that simulate said intervention according to reality, allowing the simulation to be as accurate as possible. In this respect, according to an alternative embodiment, the first part of the simulation assembly can be composed of one or more layers that allow to reproducing the real behavior of a puncture intervention, simulating the behavior of the actual layers of the skin such as epidermis, dermis and subcutaneous tissues. The second part of the simulation assembly, which corresponds to the target structure of the medical simulator, is integrated or embedded in the simulation assembly, particularly in the first part of said assembly. As stated above, the second part of the simulation assembly may comprise one or more target structures, either the same or of different types, depending on the type of intervention to be simulated. For example, in the simulation of a vascular intervention, the second part of the simulation assembly is formed by one or more ducts that simulate the structures of the circulatory system, integrated in the simulation assembly, with said ducts being the target structure in this example.

Additionally, according to the preferred embodiment, the target structure is a functional element arranged in the phantom to recreate the behavior of said target structure. In the same example above, for the case of the circulatory system as a target structure, the functional element is the ducts through which a fluid similar to blood flows or that simulates the blood's behavior, where said fluid circulates by action of gravity or by the action of a pump, thus providing functionality to the target structure. In addition, said ducts can simulate the behavior of vascular tissue, such as resistance to perforation. Additional embodiments of the present invention comprise that the second part of the phantom simulation assembly is formed by one or more target structures, arranged in one or more layers of the first part of said assembly. In the same way, one or more target structures can be arranged in the same or different layers of the simulated anatomy, for the simultaneous training of different interventions and procedures.

Considering the above, according to the preferred embodiment, the simulation assembly is characterized by a sandwich structure comprising one or more target structures integrated in one or more layers of the simulation assembly, where said sandwich structure can be replaced in a free and simplified way, so that to maintain the phantom as a result of the damage it may suffer in training. Therefore, according to the present embodiment, the maintenance of the medical simulator is carried out by replacing a single piece corresponding to the simulation assembly, which comprises all the components and elements of the simulator that are punctured during training.

In addition, according to the above, the simulation assembly can have different characteristics depending on the type of procedure to be simulated. In fact, the use of different simulation assemblies allows choosing between different anatomical characteristics of different patients and in different types of procedures. For example, the simulation assembly can integrate a layer that has more fatty tissue simulating an obese patient, or can also integrate a simulation assembly that has thinner veins, such as to simulate a child. Likewise, combinations of different anatomical characteristics can be made, allowing to enlarging the range of simulation offered by the present medical simulator. Therefore, among the advantages of this medical simulator, we have the incorporation of different kits or simulation assemblies for training in different procedures and/or different scenarios, using the same basic structure and information processing system.

Notwithstanding the above, an alternative embodiment of the phantom allows the simulation assembly to be separated in its first and second part, arranging the target structure as an external component to the layer or layers that make up the simulation of the anatomical tissue.

On the other hand, according to a secondary embodiment of the medical simulator of the present invention, the simulation assembly can comprise another type of sensors for the measurement of different actions by the user during the procedure, for example a pressure sensor arranged nearby the surface of the simulation assembly, particularly integrated to the first part thereof, to detect the binding of the phantom. The information from said pressure sensor could be used in simulated training, for example, to measure the duration of training by detecting the start and end of the puncture procedure.

Base Structure

Finally, the phantom comprises a base structure that forms the phantom support. Said base structure is preferably a resistant substrate which makes the arrangement of the phantom possible on a surface during the procedure. According to an alternative embodiment, the base structure simulates the general behavior of the internal tissues of the intervened anatomy, particularly the resistance to pressure applied by the user during the intervention. Additionally, the base structure must be adapted to house and fix the simulation assembly, comprising accommodation and fixing means for said purposes.

According to an embodiment of the medical simulator, the accommodation and fixing means comprise an additional structure in the form of a housing, which has a space for receiving and firmly housing the simulation assembly used in training. However, said housing and fixing means can be any type of element that allows to fixing the simulation assembly to the phantom's base structure. In this context, the simulation assembly can be located in the phantom's means of accommodation and fixation by insertion under pressure that allows its subsequent release for repair and/or replacement.

Intervention Device

According to the present invention, the intervention device comprises a real puncture instrument arranged for manipulation by a user, for example a syringe, needle and/or cannula, where said puncture instrument integrates sensing means, for example accelerometers and/or gyroscopes, which allow to determine their position with respect to the corporal or phantom model.

The use of real puncture instruments allows the simulation of the real procedure with great precision, thus resulting in a considerable improvement with respect to the training systems used today, which use interfaces that simulate medical instruments, preventing the user from getting used to the instrumentation used in the real procedures.

According to a preferred embodiment, the sensing means of the intervention device are integrated in a small sensing capsule that replaces the back cover of the catheter. This way the sensing capsule is compatible with any catheter size used in real situations and can be reused an indefinite number of times. Said sensing capsule is connected to the data acquisition module of the medical simulator for the transmission of the sensed information.

Furthermore, through detection means that are also integrated into the intervention device, the sensing capsule is responsible for recording the contact of the electrodes in the phantom with the tip of the puncture instrument (area uncovered by the catheter). According to one embodiment, the detection means of the intervention device correspond to a conductive bar dimensioned in such a way that it can extend into the rear plastic area of the catheter, located inside the capsule, in the area inserted in the back of the catheter. The conducting bar may be connected to the ground of the circuit or use a predetermined voltage as reference, extending supported by an adaptation system in such a manner that it makes contact with the portion of the puncture instrument that extends into the reflux zone of the catheter, ensuring that this contact is maintained regardless of the type of catheter used. This way the puncture instrument remains connected to the circuit, so that by touching the electrodes present in the phantom, this contact can be recorded. The adaptation system can be a system of elastic materials, such as a plastic tube or one or more springs, which by means of the elastic action maintains the contact of the bar on the puncture instrument.

In addition, according to a preferred embodiment, the sensing means of the sensing capsule recording the movement of the puncture instrument are integrated in an IMU (Integrated Motion Unit) that is in communication with the processing and visualization system, where according to one embodiment, said communication is performed through a serial communication such as I2C, which can be done through another type of communication protocol. According to the preferred embodiment, the IMU registers the angular position (by means of a gyroscope) and the linear acceleration (by means of an accelerometer), giving 6 degrees of freedom and the option of determining 2 angles (roll & pitch) and the direction of movement. All these data are processed by the processing and visualization system to determine the way in which the intervention device moves during the training. Indeed, according to an embodiment, the IMU not only allows to detect the angle of attack of the intervention device at the time of initiating the puncture, but it also allows to characterize the complete movement of the intervention device, for example, by detecting how many times the user goes back and tries the procedure again during the same training.

Processing and Visualization System

Finally, the medical simulator of the present invention comprises a processing and visualization system for the collection, storage and visualization of the information linked to training, capable of providing an automated feedback of the performance of the simulated procedure. Said processing and visualization system is in communication both with the phantom and with the intervention device, with said communication preferably being wireless.

The processing and visualization system monitors the training process by collecting information from the sensing means in the intervention device and the means of detection in the phantom, offering storage and processing capabilities for said information either in a local database or in a database arranged on a server connected to a network. Through the monitoring and processing of information from the phantom and the intervention device, the processing and visualization system allows feedback to the user in real time, which is visualized, through a graphical interface.

Additionally, the processing and visualization system allows the storage of information for later viewing through a graphical interface, where access to said information can be done remotely by connecting to the network in which the information is stored. In this respect, the users of the medical simulator have access not only to the information of instantaneous feedback during the training process, but also to the historical information of the training sessions stored, being possible to evaluate the performance of the training within a period of time.

Among the information monitored by the processing and visualization system, the handling of the intervention device by the user is found, measured through the sensing means provided in said device. In this respect, the handling information of the intervention device is characterized through its movement, through its position in the work space, its relative position with respect to the phantom, inclination in space, angle of attack with respect to the phantom, acceleration and other parameters measured through the sensing means, as described above.

In addition, another type of information monitored by the processing and visualization system comprises the detection of the intervention device by the detection means arranged in the phantom and in the intervention device, where said information is characterized by electrical signals originated by the presence of the intervention device when it comes into contact with the means to detect the phantom. This way not only the presence of the intervention device is detected, but it is also possible to obtain the position thereof in the phantom when knowing the position of it or the detection means arranged therein.

Alternative modalities of the medical simulator comprise that at least part of the information monitored by the processing and visualization system is information relative to the behavior of the target structure during the simulated procedure, for which sensing means are provided that measure the behavior of said target structure. For example, in the case of the circulatory system as a target structure, flow sensors can be arranged to detect variations in the flow of the liquid circulating inside the ducts that make up said structure. On the other hand, the target structure may also comprise detection means to detect the presence and position of a cannula in said target structure.

Considering the above, according to the preferred embodiment of the invention, the processing and visualization system is divided into two main parts, a data acquisition module and a processing and visualization module.

Data Acquisition Module

The data acquisition module is an electronic system that, according to the preferred embodiment, is inside the phantom, particularly integrated into the base structure thereof. The acquisition module allows integrating the measurements made by the detection means and sensors of the intervention device, particularly by the IMU, and by the detection means and sensors presented by the phantom, particularly the electrodes, communicating said measurements in the right form to the data processing and visualization module that does all the processing of the measurements acquired.

According to the preferred embodiment, the acquisition module is composed of a power source and a microcontroller, where the latter receives the inputs of the medical simulator detection means and processes them as digital sensors. This way, when one of the detection means is touched by the puncture instrument, the acquisition module manages to sense said interaction and record it. On the other hand, the microcontroller in the acquisition module also receives, through an architecture and communication protocol that can be serial, of the I2C type or another type of communication, the data coming from the IMU. These are analyzed by the acquisition module and sent to the processing and visualization module, for example, in real time.

Considering the above, the actions of the electrodes as detection means are sent as interruptions in this data communication.

Notwithstanding the foregoing, the acquisition module may comprise a storage memory for the storage of the data and information gathered during the training, allowing to performing the training without a processing and visualization device. In this context, after connecting a processing and visualization device, the user will be able to access the training information and the corresponding feedback by loading the integrated information from the acquisition module storage memory.

The acquisition module can be connected to the processing and visualization module via a physical data communication interface, for example by means of a USB cable using serial protocol, or a wireless connection using bluetooth and serial communication. In general, any type of architecture and communication protocol can be used between the communications of the components of the medical simulator.

Processing and Visualization Module

The processing and visualization module comprises a computer and visualization system that is connected to the medical simulator, where said processing and visualization module can be a Smartphone, Tablet, personal computer or any other electronic device that allows to process and visualize the information regarding training. In this context, the processing and visualization module can be integrated in single electronic equipment, which in turn can be part of the medical simulator or be an external equipment, for example owned by the user, which is connected to the medical simulator when training begins.

Additionally, one embodiment contemplates that the processing and visualization module is not connected during training, with the same being performing directly in the medical simulator and storing the information of training in the acquisition module, for its further processing and visualization.

In this context, the processing and visualization module integrates program instructions that allow to processing the information and show it to the user offering objective feedback for the training process, being able to use for these purposes the resources of the electronic equipment that is connected to the medical simulator. According to an embodiment, said objective feedback of the training is delivered to the user presenting the training data and information by means of statistics, which can be stored in a database, for example on a server, for later review. This feedback is based on processed information that is useful for training in puncture procedures, such as:

a. Change of the angle in time and before and after effective cannulation.
b. Number of times and location in time where the catheter is retracted.
c. Duration of the procedure from the placement of binding until its release.

BRIEF DESCRIPTION OF THE FIGURES

As part of the present invention, the following representative figures of the invention are presented, which show a preferred embodiment thereof and, therefore, should not be considered as limiting the definition of the invention.

DETAILED DESCRIPTION OF THE PREFERRED EMBODIMENT

Figure 1:
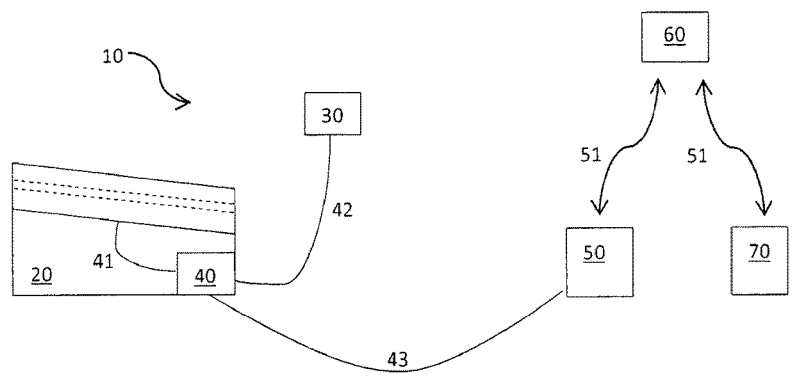
FIG. 1 shows a scheme of the medical simulator according to a preferred embodiment.

In FIG. 1 a scheme of the medical simulator is shown according to a preferred embodiment of the invention, where it is seen that the medical simulator 10 comprises a phantom 20, an intervention device 30, an acquisition module 40 and a processing and visualization module 50, where said phantom 20 and intervention device 30 are in data communication 41, 42 with the acquisition module 40, which in turn is in data communication 43 with the processing and visualization module 50.

Additionally, in FIG. 1 it can be seen that the processing and visualization module is in communication with a server 60 through a network 51, where said server 60 is accessible by means of a terminal equipment 70 through the network 51, and either wirelessly or through a cable connection. The terminal equipment 70 allows to visualizing the information contained in the server with respect to the intervention procedure, either in real time and/or the historical information of training, where said historical information can be stored in the processing and visualization module, on an external database or in a server accessible by communication network 51. In this context, according to a preferred embodiment of the invention, the processing and visualization module 50 is integrated or corresponds entirely to the user's terminal equipment 70 used to access to the information, where said terminal equipment 70 acts as a processing and visualization module 50 when connected to the data acquisition module 40 via the data communication interface 43.

Figure 2:
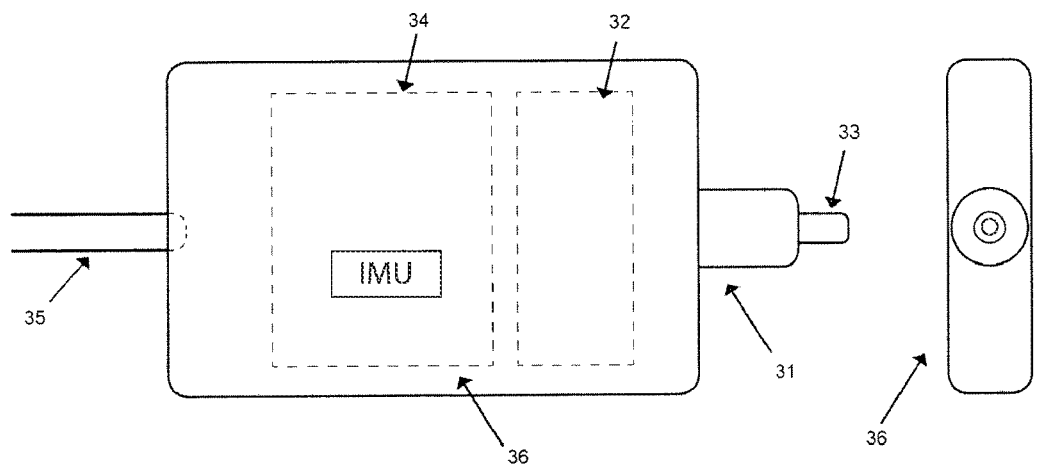
FIG. 2 shows a diagram of the intervention device of the medical simulator according to a preferred embodiment.

FIG. 2 shows a diagram of the intervention device 30 of the medical simulator according to a preferred embodiment of the invention, where it is appreciated that the intervention device comprises:

an adapter 31 that allows the intervention device to be attached to the back of a catheter (not shown);

an adaptation system 32 that allows the extension of a conductive bar 33 to generate electrical contact with the rear part of a puncture instrument such as a needle (not shown);

the conductive bar 33 which, connected to the adaptation system 32, allows the connection of the puncture instrument with the electrical circuit, extending until making electrical contact with said instrument, where said conductive bar can be a metal bar;

an IMU 34 integrated into the intervention device, where said IMU collects data and sends them through a cable 35 to the acquisition module integrated in the phantom; and the cable 35 joining the IMU with the acquisition module.

According to an embodiment of the medical simulator the intervention device can be presented in a package connected to the catheter, comprised of a reusable plastic capsule that adapts to any catheter to be used in the procedure, with said package being called sensing capsule 36.

On the other hand, the adapter 31 of the intervention device is an element that adapts to the standard connection with different types of catheters, with a standard diameter that allows coupling to the sensing capsule 36 with different puncture instruments.

Figure 3:
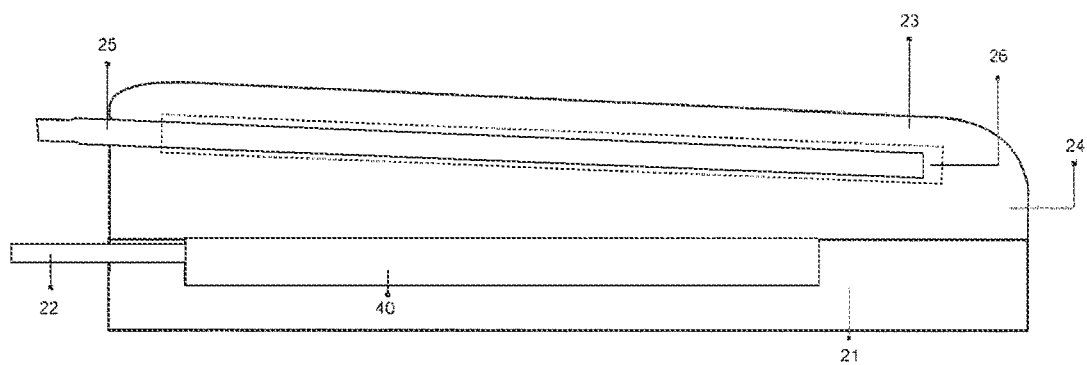
FIG. 3 shows a phantom scheme of the medical simulator according to a preferred embodiment.
Figure 5:
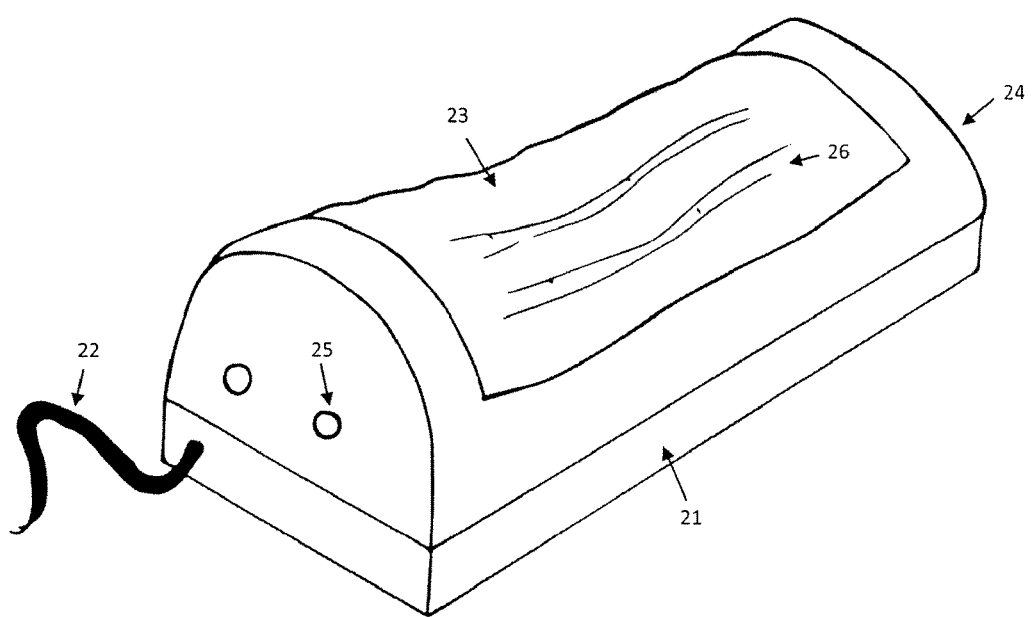
FIG. 5 shows a perspective view of the phantom of the medical simulator according to an alternative embodiment.

In FIGS. 3 and 5 a phantom 20 scheme of the medical simulator is shown according to a preferred and alternative embodiment of the invention, respectively, said phantom 20 comprises:

- a base structure 21, which houses the data acquisition module;
- a data cable 22 communicating the data acquisition module, housed in the base structure 21, with the intervention device;
- a simulation assembly 23 arranged on the base structure 21, comprising inside the target structure and the sensor electrodes, connecting directly to the data acquisition module located in the base structure 21;
- a housing and fixing means the simulation assembly 23, which in an alternative embodiment is a housing 24;
- holes 25 in the housing, which allow the target structure to be connected to the outside, for example, to include a reservoir of fluid that circulates through the target structure.

The simulation assembly 23 also comprises the skin simulation, including all the physical characteristics of the simulation and being replaceable for the maintenance of the simulator or for the change of the simulation conditions. Additionally, FIG. 3 shows a representation of the target structures 26 integrated in the simulation assembly 23, which according to the preferred embodiment corresponds to the simulation of veins or arteries. Said target structures 26 are connected to a reservoir with pressure or to a pump (not shown) through the holes 25 present in the housing 24. The target structures can be modified by changing the simulation assembly 23 to simulate different scenarios, changing the target structures in shape, arrangement, size and/or composition according to the scenario that you want to simulate.

Figure 4:
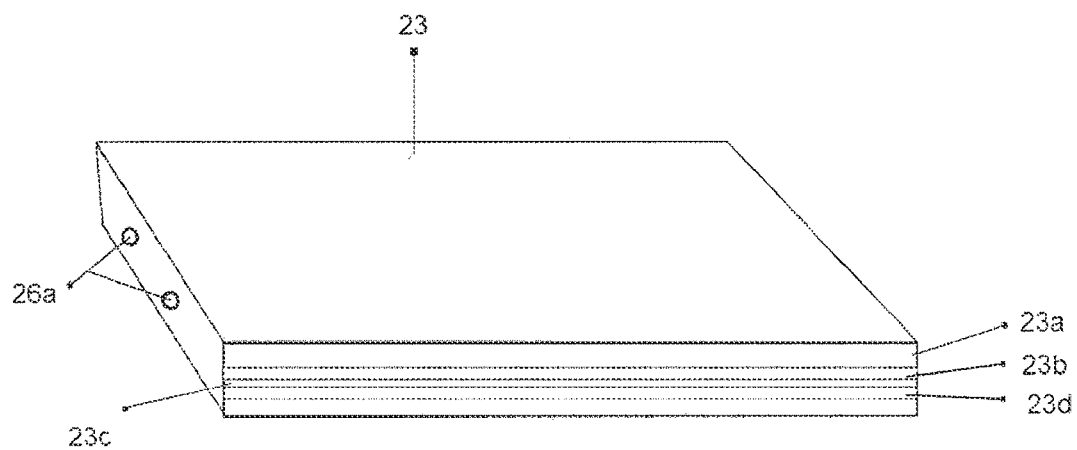
FIG. 4 shows a scheme of the simulation assembly of the medical simulator according to a preferred embodiment.
Figure 6:
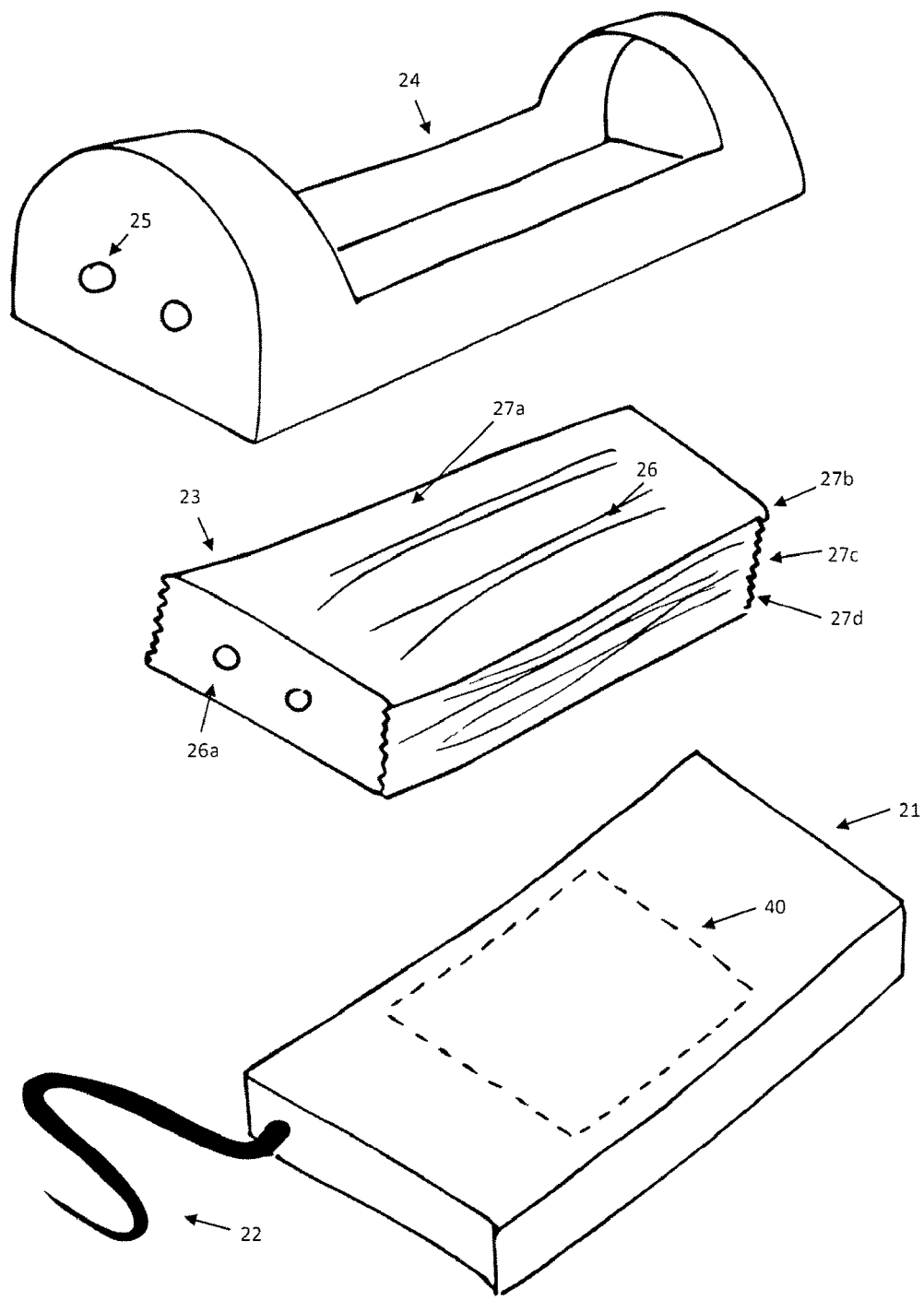
FIG. 6 shows the phantom in an exploding view of the medical simulator according to an alternative embodiment.

FIG. 6 shows an exploded view of the phantom 20 of the medical simulator according to an alternative embodiment, according to a preferred embodiment thereof, showing the arrangement of the housing 24 for fixing and housing the simulation assembly 23 on the base structure 21. In addition, FIG. 4 shows a reference structure of the simulation assembly 23 more clearly, which according to the present embodiment comprises a first part divided in layers, where said layers comprise:

- an outer layer 23a representing the outer face of the simulation assembly, simulating the dermis and where said outer layer 23a can vary in transparency according to the scenario to be simulated;
- a first inner layer 23b, which is located above the target structures, integrating the first detection means of the phantom or first electrode, which allows detecting the entry of the needle or puncture instrument, being able to vary in thickness according to the scenario to be simulated;
- an intermediate internal layer 23c that houses the target structures 26, corresponding in this embodiment to veins and/or arteries to be cannulated, where said veins and arteries also end at the ends 26a where they are connected to the pressurized reservoir through the holes 25 of the housing 24; and
- a second inner layer 23d which is located under the target structures, integrating the second means of detecting the phantom or second electrode, which allows detecting whether the puncture or needle instrument has passed the level of the target structure, and the connector in order to connect with the acquisition module 40 in the inner layer 21.

The data acquisition module 40 integrates the data coming from the intervention device 30, and from the phantom 20, particularly from the simulation assembly 23, sending said information to the processing and visualization module 50 through a cable 22 or through another type of communication, for example wireless when incorporating an antenna to the acquisition module 40, so that to allow the integration of the data acquired by the intervention device with the data of the simulation assembly and send them to the processing and visualization module 50, either in real time or after its storage.

With this configuration, the medical simulator 10 is a portable system that facilitates training in peripheral and/or central puncture procedures, reducing the complexity of the existing systems by offering a simple interface that connects with external processing and visualization modules. In addition, the medical simulator 10 facilitates the simulation of different training scenarios, by allowing the easy replacement of the simulation assembly that integrates all the structures involved in the simulation process.

Other embodiments of the medical simulator are apparent from the technical definition proposed above. In fact, the preferred embodiment described in this document should not be understood as a limitation to the scope of the present invention, which is configured from the assembly of claims presented in this document.

Operation of the Medical Simulator According to Preferred Embodiment

Below, the interaction between the components of the medical simulator and the operation thereof is described through the following steps associated with a cannulation procedure.

1. By means of the computer program integrated in the processing and visualization module 50, the user chooses a situation to be simulated. To this effect, the user will choose appropriate parameters (the arm of a child, or the leg of an obese patient) according to the simulation assembly that is installed in phantom 20, for example, using a simulation assembly associated with an obese patient and using simulation parameters associated with this type of patient. In this context, the detection of the hardware present in the phantom 20 can be automatic.

2. The simulation is initiated by means of a digital button implemented in the software or by linking the phantom at the beginning of training, using a pressure sensor in communication with the acquisition module 40.

3. While the user attempts perform a puncture with the intervention device 30, the sensing means sends the movement data from the intervention device 30 to the acquisition module 40 and this in turn analyzes the data and, for example, sends the angle of the intervention device 30 over the phantom 20 to the processing and visualization module 50 comprising the terminal equipment 70.

4. The acquisition module 40 recognizes when there is an effective cannulation (i.e., when the catheter/Teflon is effectively inside the vein) and sends a signal to the processing and visualization module 50, and then continues to collect the associated data.

5. In the event that there is a perforation of the lower wall of the vein, this is also detected by the acquisition module 40 and sends a signal to the processing and visualization module 50.

6. Once the intervention device 30 is removed, and the catheter installed, the trainee completes the procedure with a digital button or with the release of the binding in the phantom.

7. The computer program in the terminal equipment 70 or processing module 50 displays significant feedback for learning. To this effect user has several options of visualization according to different parameters that are significant for learning. Among the parameters analyzed by the medical simulator and which are important for learning the following can be mentioned:

a. Change of angle in time and before and after effective cannulation.

b. Number of times and location in time where the catheter is retracted.

c. Duration of the procedure from the placement of binding until its release.

In addition, the processing and visualization module 50 can integrate the measurement of other variables such as the right use of cleaning implements and the right disposal of sharp objects, among other feedback information.

LIST OF REFERENCES

10 Medical simulator
20 Phantom
21 Base structure
22 Data cable
23 Simulation assembly
23a External layer
23b First internal layer
23c Intermediate layer
23d Second internal layer
24 Housing and fixing means (housing)
25 Holes
26 Target structure
26a End of the target structure
30 Intervention device
31 Adapter
32 Adapting system
33 Conductive bar
34 IMU
35 Data cable
36 Sensing capsule
40 Acquisition module
41, 42, 43 Data communications
50 Processing and visualization module
51 Network
60 Server
70 Terminal equipment

The invention claimed is:

1. A medical simulator of procedures associated with punctures, for simulation and practical training of puncture interventions, wherein the medical simulator comprises a phantom, an intervention device and a processing and visualization system in data communication with the phantom and the intervention device, wherein the phantom comprises at least one target structure arranged for the practical training of the puncture interventions and means for detecting the intervention device, said detection means being in data communication of data with the processing and visualization system, wherein the intervention device comprises a real puncture instrument that includes:

sensing means coupled to the puncture instrument by means of an adapter of the intervention device, wherein said sensing means are in data communication with the processing and visualization system, and detection means coupled to the puncture instrument by means of the adapter of the intervention device, wherein said detection means are in data communication with the processing and visualization system, wherein the phantom comprises a structure with at least two components:

a simulation assembly that simulates a behavior of tissues and anatomical structures and that integrates the target structure of the phantom, and a base structure forming a phantom support, for fixing the phantom to a surface during puncture interventions, wherein the base structure comprises accommodation and fixing means for housing and fixing the simulation assembly, wherein the simulation assembly comprises at least one detection means of the intervention device arranged on the target structure, detecting said device when it comes into contact with the target structure, and at least one detection means of the intervention device arranged under the target structure, detecting if said intervention device has crossed a level of the target structure, wherein the processing and visualization system collects, stores, processes and displays data coming from the sensing means and detection means of the medical simulator for visualization of information by a user through a graphic interface.

2. The medical simulator according to claim 1, wherein the target structure is a functional element that recreates a behavior of the main organs of a human body during puncture interventions.

3. The medical simulator according to claim 1, wherein the phantom simulation assembly comprises a first part that includes an elastic structure that simulates the skin and a second part that comprises at least one duct for the circulation of a fluid.

4. The medical simulator according to claim 1, wherein the sensing means and the detection means of the intervention device are grouped in a sensor capsule coupled to the puncture instrument and in data communication with the processing and visualization system.

5. The medical simulator according to claim 4, wherein the sensor capsule comprises the adapter of the intervention device that replaces a back cover of a catheter.

6. The medical simulator according to claim 5, wherein the sensor capsule is reused an indefinite number of times, adapting to different catheters.

7. The medical simulator according to claim 1, wherein the detection means of the intervention device register a contact between the at least one detection means of the phantom and a tip of the intervention device.

8. The medical simulator according to claim 1, wherein the sensing means of the intervention device comprises an IMU (integrated motion unit) in communication with the processing and visualization system.

9. The medical simulator according to claim 1, wherein the detection means of the simulation assembly comprises two electrodes connected to the processing and visualization system, wherein a first electrode of the simulation assembly is located above the target structure and wherein a second electrode is located under the target structure.

10. The medical simulator according to claim 9, wherein the electrodes are of a conductive material that can be punctured without being damaged.

11. The medical simulator according to claim 1, wherein the detection means of the intervention device comprises a conductive bar which is connected to the ground of a circuit formed by sensing means, detection means and processing and visualization system, at a predetermined reference voltage or to a node of the circuit, with the bar supported by an adaptation system extending in such a way that it makes contact with the puncture instrument, leaving the puncture instrument connected to the circuit, so that when touching the electrodes present in phantom this contact can be registered.

12. The medical simulator according to claim 1, wherein the phantom simulation assembly is formed by one or more layers, used to simulate different types of anatomical tissues, in which detection means can be arranged to detect a position of the puncture instrument of the intervention device in said simulation assembly, and wherein at least one of said layers integrates to at least one target structure.

13. The medical simulator according to claim 1, wherein it comprises one or more target structures, for simultaneous training of different interventions and procedures.

14. The medical simulator according to claim 1, wherein the simulation assembly is removable for repairs and/or replacement.

15. The medical simulator according to claim 3, wherein the first and second parts of the simulation assembly are detachable separately for repair and/or replacement.

16. The medical simulator according to claim 1, wherein the sensing means, detection means and the processing and visualization system form a circuit.

17. The medical simulator according to claim 1, wherein characteristics of the simulation assembly shape depend on types of procedure to be simulated and/or on anatomical characteristics of a patient.

18. The medical simulator according claim 1, wherein the processing and visualization system gives the user feedback on a performance of a simulated procedure, after the simulated procedure or in real time, which is visualized by the user through the graphic interface in a terminal equipment.

19. The medical simulator according to claim 1, wherein the processing and visualization system stores the data and information in a local database or in a database arranged in a server accessible by means of a network.

20. The medical simulator according to claim 19, wherein the information is stored for its later visualization through the graphic interface, wherein access to said information can be done remotely by means of connection to the network.

21. The medical simulator according to claim 20, wherein users of the medical simulator have access not only to instantaneous feedback information during a training session, but also to historical information of stored training sessions.

22. The medical simulator according to claim 1, wherein the simulation assembly comprises a pressure sensor arranged to detect phantom binding, using said detection as the beginning of a training session.

23. The medical simulator according to claim 1, wherein the sensing means correspond to accelerometers and/or gyroscopes, which allow determining position and movement of the intervention device with respect to the phantom.

24. The medical simulator according to claim 1, wherein the data are processed by the processing and visualization system to determine a manner in which the puncture instrument is moved during a training session.

25. The medical simulator according to claim 1, wherein the processing and visualization system comprises a data acquisition module and a processing and visualization module.

26. The medical simulator according to claim 25, wherein the data acquisition module is arranged in the phantom, particularly in the base structure thereof, for acquiring the data measured by the sensing means and detection means, and sending the acquired data to the processing and visualization module.

27. The medical simulator according to claim 26, wherein the processing and visualization module is arranged in a terminal equipment, for processing information received from the data acquisition module and displaying the processed information in the graphic interface.

28. The medical simulator according to claim 25, wherein the data acquisition module is an electronic system that integrates measurements made by the sensing means of the intervention device and by the detection means and sensors of the phantom, communicating said measurements to the data processing and visualization module where the acquired measurements are processed.

29. The medical simulator according to claim 28, wherein the acquisition module comprises a power source and a microcontroller, wherein the latter receives signal from the detection means and sensors to record movement and position of the intervention device and when the puncture instrument of the intervention device comes into contact with said detection means.

30. The medical simulator according to claim 28, wherein the acquisition module communicates with the sensing and detection means of both the intervention device and the phantom, wherein said communication can be performed by cable or wireless and carried out according to different architectures and communication protocols.

31. The medical simulator according to claim 25, wherein the acquisition module can be connected to the processing and visualization module through a physical data communication interface, for example by means of a USB cable using serial protocol, or a wireless connection using bluetooth and serial communication.

32. The medical simulator according to claim 25, wherein the processing and visualization module comprises a computer and visualization system that is connected to the medical simulator, said processing and visualization module can be a Smartphone, Tablet, personal computer or any other electronic device that allows to process and visualize information regarding training sessions.

33. The medical simulator according to claim 32, wherein the processing and visualization module are integrated in a single electronic equipment, which in turn can be integrated into the medical simulator or be an external equipment, for example of the user, that connects to the medical simulator when a training session begins.

34. The medical simulator according to claim 25, wherein the processing and visualization module integrates program instructions that allow processing the information and showing it to the user offering objective feedback information of a training session.

35. The medical simulator according to claim 34, wherein among the objective feedback information there is:
    a. Change of an intervention device angle in time, before and during a procedure,
    b. Number of times the intervention device is removed and its location, and
    c. Duration of a puncture procedure.

\* \* \* \* \*